US007187910B2

(12) United States Patent
Kim et al.

(10) Patent No.: US 7,187,910 B2
(45) Date of Patent: Mar. 6, 2007

(54) DIRECTIONAL COUPLER AND DUAL-BAND TRANSMITTER USING THE SAME

(75) Inventors: Ki Joong Kim, Chollabook-do (KR); Dae Heon Hur, Kyungki-do (KR); Woo Jin Byun, Kyungki-do (KR)

(73) Assignee: Samsung Electro-Mechanics Co., Ltd., Kyungki-do (KR)

( * ) Notice: Subject to any disclaimer, the term of this patent is extended or adjusted under 35 U.S.C. 154(b) by 462 days.

(21) Appl. No.: 10/859,147

(22) Filed: Jun. 3, 2004

(65) Prior Publication Data

US 2005/0239421 A1 Oct. 27, 2005

(30) Foreign Application Priority Data

Apr. 22, 2004 (KR) ...................... 10-2004-0027709

(51) Int. Cl.
*H04B 1/02* (2006.01)

(52) U.S. Cl. ................................ 455/115.3; 455/553.1; 333/109

(58) Field of Classification Search ............. 455/115.1, 455/553.1, 115.3; 333/109–117
See application file for complete search history.

(56) References Cited

U.S. PATENT DOCUMENTS 4,216,446 A * 8/1980 Iwer ........................... 333/112
5,392,464 A * 2/1995 Pakonen .................. 455/115.1
5,884,149 A * 3/1999 Jaakola ....................... 455/103
6,150,898 A * 11/2000 Kushitani et al. ........... 333/110
6,496,708 B1 * 12/2002 Chan et al. .............. 455/553.1
6,759,922 B2 * 7/2004 Adar et al. ................ 333/109

FOREIGN PATENT DOCUMENTS

| | | | |
|---|---|---|---|
| EP | 0 859 464 | | 8/1998 |
| JP | 3-216002 | | 9/1991 |
| JP | 10-303761 | | 11/1998 |
| JP | 10-335912 | A1 | 12/1998 |
| JP | 2000-278149 | | 10/2000 |
| JP | 2003-188047 | A1 | 7/2003 |

OTHER PUBLICATIONS

Japanese Patent Office, Office Action mailed Jul. 11, 2006.

* cited by examiner

*Primary Examiner*—Edward F. Urban
*Assistant Examiner*—Blane J. Jackson
(74) *Attorney, Agent, or Firm*—Lowe Hauptman & Berner, LLP.

(57) ABSTRACT

Disclosed herein are a directional coupler which is implemented with strip lines for signal coupling and inter-digital capacitors for phase compensation, and a dual-band transmitter using the same. The directional coupler includes a first transmission device, a first directional coupling device for coupling a part of a signal from the first transmission device, a first inter-digital capacitor connected between the first transmission device and the first directional coupling device, a second transmission device, a second directional coupling device for coupling a part of a signal from the second transmission device, and a second inter-digital capacitor connected between the second transmission device and the second directional coupling device.

7 Claims, 6 Drawing Sheets

DIRECTIONAL COUPLER AND DUAL-BAND TRANSMITTER USING THE SAME

BACKGROUND OF THE INVENTION

1. Field of the Invention

The present invention relates to a directional coupler which is applied to a dual-band mobile communication terminal such as a dual-band mobile phone, and more particularly to a directional coupler which is implemented with strip lines for signal coupling and inter-digital capacitors for phase compensation so that it can be improved in directivity, minimized in process error and miniaturized to be readily implemented in one-chip form, and a dual-band transmitter using the same.

2. Description of the Related Art

In general, a power amplifier is used in a transmitter of a mobile communication terminal, such as a mobile phone, to amplify power of a transmit signal to be sent out through an antenna of the terminal. This power amplifier has to amplify the transmit signal to an appropriate power level. Methods for regulating output power of the power amplifier can be roughly classified into two types, a closed loop type of detecting a part of an output signal from an output port of the power amplifier through a directional coupler, converting the detected signal into direct current (DC) current using a Schottky diode and comparing the converted DC current with a reference voltage through a comparator, and an open loop type of regulating power by sensing a voltage or current applied to the power amplifier.

The closed loop method is a traditional method and has the advantage of being able to finely control power, but the disadvantage of involving complexity in circuit implementation and degrading efficiency of the amplifier due to a loss by the coupler. The open loop method is currently often used in that it involves simplicity in circuit implementation, but has the disadvantage of being unable to finely control power.

Recently, components used in the closed loop method have been provided in integrated circuit (IC) form, thereby making circuit implementation simple. Further, the performance of a control chip has become better, thereby significantly lowering the coupling value of the directional coupler, resulting in a significant reduction in loss by the coupler. Particularly, the closed loop method capable of finely controlling power has been applied to a GSM (Global System for Mobile) communication system where much attention is given to a ramping profile.

A transmitter with a power control function of the above-mentioned closed loop type will hereinafter be described with reference to FIG. 1.

FIG. 1 is a block diagram showing the configuration of a conventional transmitter.

As shown in FIG. 1, the conventional transmitter comprises a power amplifier 11 for amplifying power of a transmit signal ST, a directional coupler 12 for coupling a part of an output signal from the power amplifier 11, a power controller 13 for controlling an amplification factor of the power amplifier 11 on the basis of the level of a signal coupled by the directional coupler 12, and a filter 14 for receiving the output signal from the power amplifier 11 through the directional coupler 12 and passing it to an antenna ANT.

Recently, a dual-band terminal has been developed which is capable of transmitting and receiving both signals of two bands, for example, a high band, such as a frequency band of a DCS (Digital Cellular System) 1800 communication system using about 1800 MHz, and a low band, such as a frequency band of a GSM communication system using about 900 MHz.

This dual-band terminal requires a directional coupler which is capable of coupling a signal of each of the two bands to control power of each band. Such a directional coupler for the dual-band terminal must have good directivity and inter-band isolation characteristics.

One such directional coupler which is applied to the dual-band terminal will hereinafter be described with reference to FIG. 2.

FIG. 2 is a layout view of a conventional directional coupler.

The conventional directional coupler shown in FIG. 2, denoted by the reference numeral 20, is adapted to couple a part of a signal between a first input port 1 and a first output port 2 and a part of a signal between a second input port 4 and a second output port 5, respectively, and output the coupled signals through a coupling port 3. To this end, the directional coupler 20 includes a first band signal line SL1, a second band signal line SL2, and a coupling line SL3 disposed between the two band signal lines SL1 and SL2 adjacently thereto. The coupling line SL3 is used in common for two bands, and has its one port connected to the coupling port 3 and its other port connected to a ground terminal via a resistor RT of 50Ω. This directional coupler has a coupling factor which is determined depending on the distance between the coupling line and each signal line and the length of the coupling line, which is typically $\lambda/4$.

A detailed description of this directional coupler is shown in European Patent No. 0,859,464 A3.

The directional coupler 20, which is typically applied to a dual-band transmitter, outputs coupled signals of two bands through one coupling port by using one coupling line. As a result, the coupler itself is reduced in size and a power controller including a detecting diode, comparator, etc. is simplified in construction, too. That is, this coupling structure is more concise and simpler in terms of size than a structure for individual coupling by bands.

However, since the coupling port is used in common for the two bands in the conventional directional coupler for the dual-band transmitter to reduce the chip size of the coupler, there is a problem in that an inter-band isolation is reduced in the dual-band transmitter.

A filter-type directional coupler using a diplexer, as shown in FIG. 3, has been proposed to improve the inter-band isolation in the dual-band transmitter.

FIG. 3 is a schematic view of a conventional filter-type directional coupler.

The conventional filter-type directional coupler shown in FIG. 3, denoted by the reference numeral 30, includes a first coupling capacitor C1 for coupling a part of a signal between a first input port 1 and a first output port 2, a second coupling capacitor C2 for coupling a part of a signal between a second input port 4 and a second output port 5, and a diplexer 31 for outputting signals coupled by the first and second coupling capacitors C1 and C2 through a coupling port 3. The diplexer 31 includes a first filter FT1 for high pass filtering the signal coupled by the first coupling capacitor C1, and a second filter FT2 for low pass filtering the signal coupled by the second coupling capacitor C2.

In this conventional filter-type directional coupler, each of the filters selectively passes only a corresponding one of the two bands and blocks the other band, thereby making the isolation between the two bands good.

In general, a directional coupler for a mobile communication terminal such as a mobile phone couples a very small amount of power necessary for power control, for example, about −33 dB or −28 dB, which leads to a coupling loss of about −0.02 dB. Considering a loss on a transmission line, a reflection loss due to mismatch, etc., a small coupling loss of about −0.05 to −0.1 dB appears.

However, the above-mentioned conventional filter-type directional coupler is disadvantageous in that it is increased in chip size and degraded in directivity, as will hereinafter be described with reference to FIGS. 4a to 4d.

Shown in FIGS. 4a to 4d are characteristics of the filter-type directional coupler of FIG. 3 in the case where a DCS band signal is transmitted through the first input port 1 and first output port 2, a GSM band signal is transmitted through the second input port 4 and second output port 5 and coupled signals of the DCS band signal and GSM band signal are outputted through the coupling port 3.

FIGS. 4a to 4d are views showing characteristics of the filter-type directional coupler of FIG. 3.

In FIG. 4a, S(2,1) and S(5,4) are insertion losses of DCS and GSM bands, respectively. In FIG. 4b, S(3,1) is a coupled value of DCS 1800 MHz, and S(3,2) is an extracted power value appearing at the DCS band output port. Here, the difference between S(3,1) and S(3,2) signifies directivity. In FIG. 4c, S(1,4) is an inter-band isolation. In FIG. 4d, S(3,4) is a coupled value of the GSM band, and S(3,5) is an extracted power value appearing at the GSM band output port. Here, the difference between S(3,4) and S(3,5) signifies directivity. S(P1,P2), where P1 and P2 mean ports, signifies the amount of a signal of the port P2 which is partially sent to the port P1. For example, S(3,1) represents the amount of a signal which is sent from the port 1 to the port 3.

In the conventional filter-type directional coupler, however, in order to extract a low coupled value of about −33 dB, it is necessary to shorten a strip line and space a signal line and a coupling line away from each other. In this case, the directivities, which are the difference between S(3,2) and S(3,1) and the difference between S(3,4) and S(3,5), appear as low values of about 0 to −1 dB, as shown in FIGS. 4b and 4d. As a result, the conventional filter-type directional coupler has the disadvantage of not being good in directivity and the disadvantage of being increased in chip size.

SUMMARY OF THE INVENTION

Therefore, the present invention has been made in view of the above problems, and it is an object of the present invention to provide a directional coupler which is implemented with strip lines for signal coupling and inter-digital capacitors for phase compensation so that it can be improved in directivity, minimized in process error and miniaturized to be readily implemented in one-chip form, and a dual-band transmitter using the same.

In accordance with an aspect of the present invention, the above and other objects can be accomplished by the provision of a directional coupler comprising: a first transmission device for transmitting a first band signal; a first directional coupling device including a first terminal and a second terminal and spaced apart from the first transmission device by a predetermined distance, the first directional coupling device coupling a part of the first band signal from the first transmission device and generating the coupled signal at the first terminal thereof, the second terminal of the first directional coupling device being connected to a ground terminal; a first inter-digital capacitor having its one side connected to the first transmission device and its other side connected to the first directional coupling device; a second transmission device for transmitting a second band signal; a second directional coupling device including a first terminal and a second terminal and spaced apart from the second transmission device by a predetermined distance, the second directional coupling device coupling a part of the second band signal from the second transmission device and generating the coupled signal at the first terminal thereof, the second terminal of the second directional coupling device being connected to the ground terminal; and a second inter-digital capacitor having its one side connected to the second transmission device and its other side connected to the second directional coupling device.

The directional coupler further comprises: a first filter connected to the first terminal of the first directional coupling device for high pass filtering the coupled signal from the first directional coupling device; and a second filter connected to the first terminal of the second directional coupling device for low pass filtering the coupled signal from the second directional coupling device.

In accordance with another aspect of the present invention, there is provided a dual-band transmitter using the above-described directional coupler.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
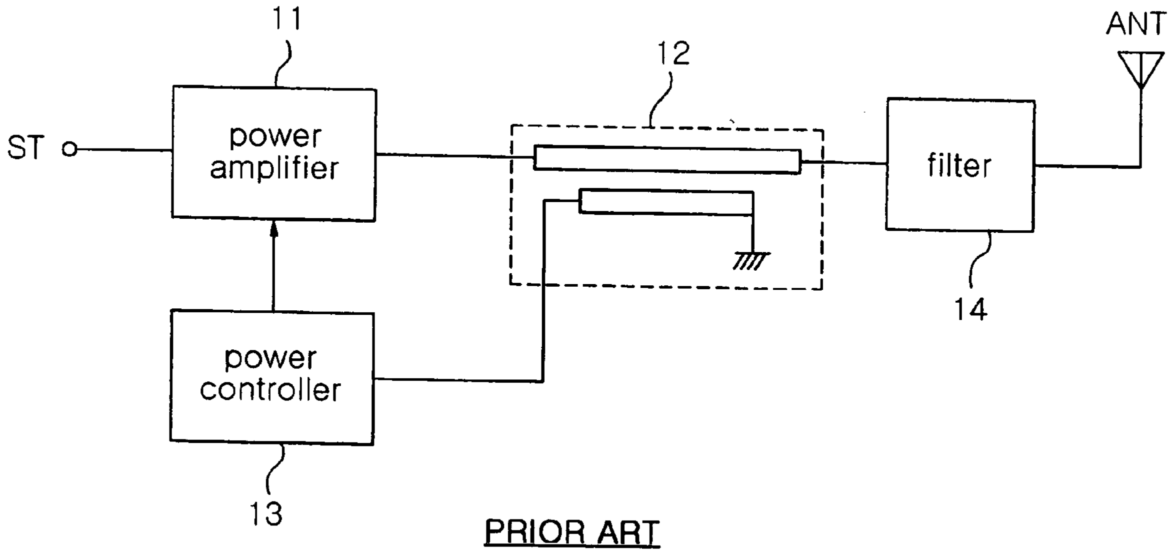
PRIOR ART FIG. 1
FIG. 1 is a block diagram showing the configuration of a conventional transmitter.
Figure 2:
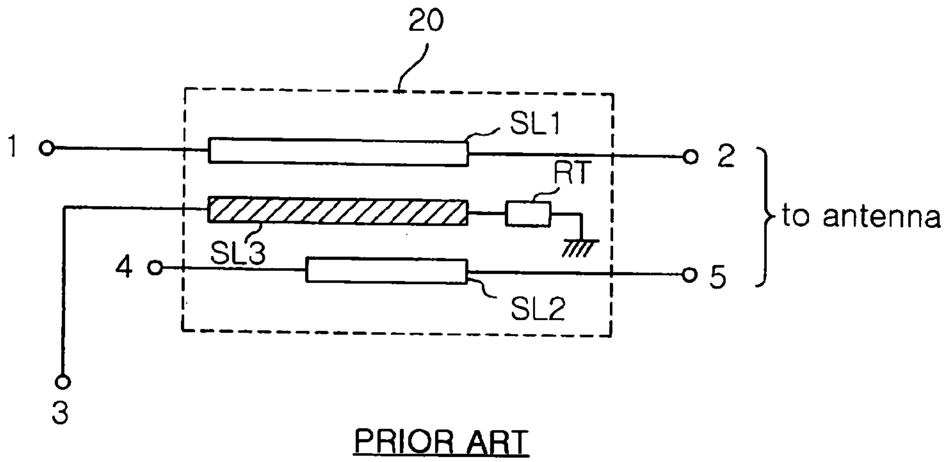
PRIOR ART FIG. 2
FIG. 2 is a layout view of a conventional directional coupler.

Now, preferred embodiments of the present invention will be described in detail with reference to the annexed drawings.

In the drawings, the same or similar elements are denoted by the same reference numerals even though they are depicted in different drawings.

Figure 5:
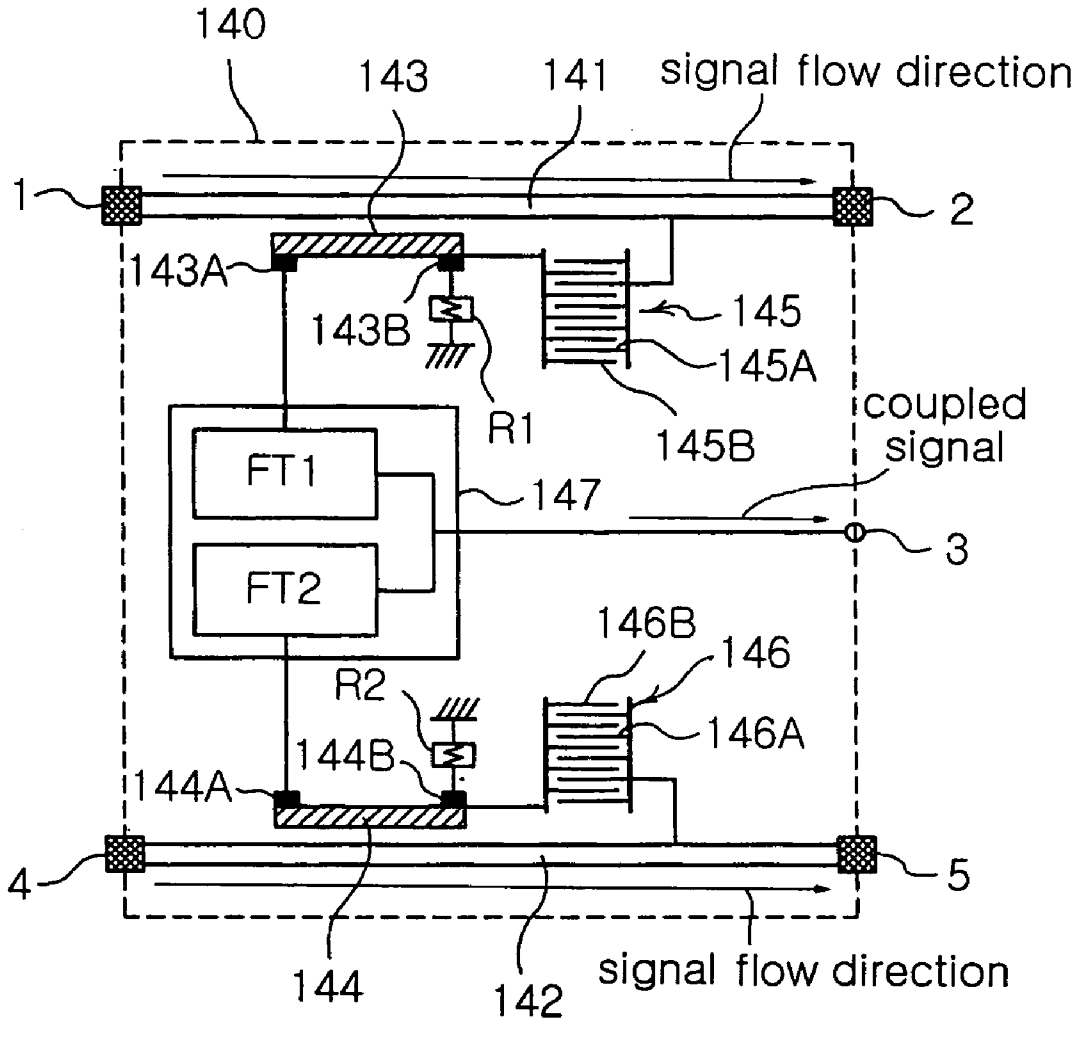
FIG. 5 is a view showing the configuration of a directional coupler according to the present invention.

FIG. 5 shows the configuration of a directional coupler according to the present invention.

With reference to FIG. 5, the directional coupler according to the present invention, denoted by the reference numeral 140, comprises a first transmission device 141 having a first port 1 and second port 2 to transmit a first band signal, and a first directional coupling device 143 including a first terminal 143A and second terminal 143B and spaced apart from the first transmission device 141 by a predetermined distance. The first directional coupling device 143 couples a part of the first band signal from the first transmission device 141 and generates the coupled signal at the first terminal 143A thereof. The second terminal 143B of the first directional coupling device 143 is connected to a ground terminal. The directional coupler 140 according to the present invention further comprises a first inter-digital capacitor 145 having its one side 145A connected to the first transmission device 141 and its other side 145B connected to the first directional coupling device 143, a second transmission device 142 having a first port 4 and second port 5 to transmit a second band signal, and a second directional coupling device 144 including a first terminal 144A and second terminal 144B and spaced apart from the second transmission device 142 by a predetermined distance. The second directional coupling device 144 couples a part of the second band signal from the second transmission device 142 and generates the coupled signal at the first terminal 144A thereof. The second terminal 144B of the second directional coupling device 144 is connected to the ground terminal. The directional coupler 140 according to the present invention further comprises a second inter-digital capacitor 146 having its one side 146A connected to the second transmission device 142 and its other side 146B connected to the second directional coupling device 144.

The directional coupler 140 according to the present invention further comprises a first filter FT1 connected to the first terminal 143A of the first directional coupling device 143 for high pass filtering the coupled signal from the coupling device 143, and a second filter FT2 connected to the first terminal 144A of the second directional coupling device 144 for low pass filtering the coupled signal from the coupling device 144. Preferably, the first filter FT1 and the second filter FT2 constitute a diplexer 147.

The second terminal 143B of the first directional coupling device 143 is connected to the ground terminal through a resistor R1, and the second terminal 144B of the second directional coupling device 144 is connected to the ground terminal through a resistor R2.

Preferably, each of the resistors R1 and R2 is set to about 50Ω, which can improve directivity of a corresponding one of the coupled signals.

Figure 6:
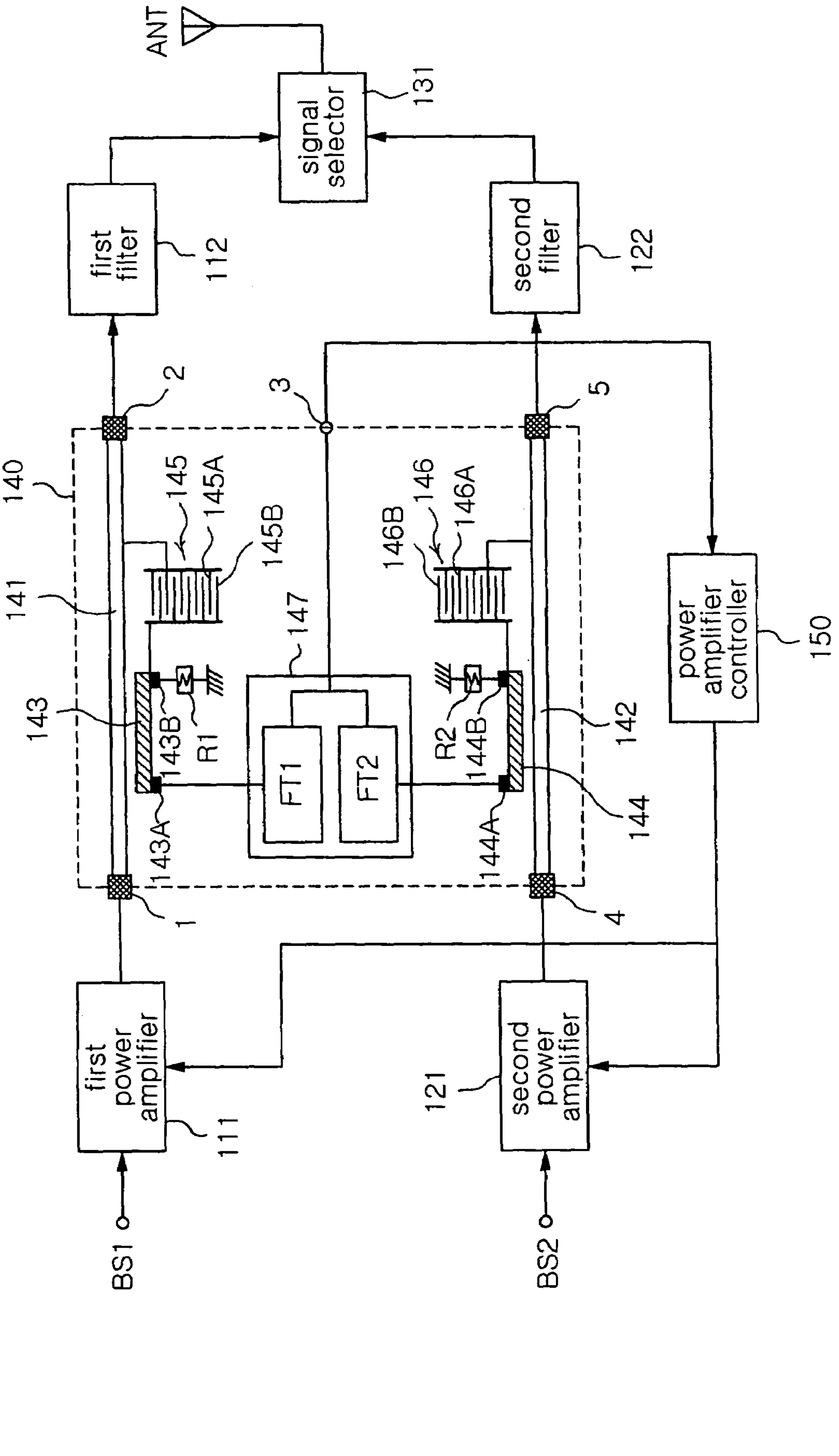
FIG. 6 is a view showing the configuration of a dual-band transmitter according to the present invention.
Figure 7:
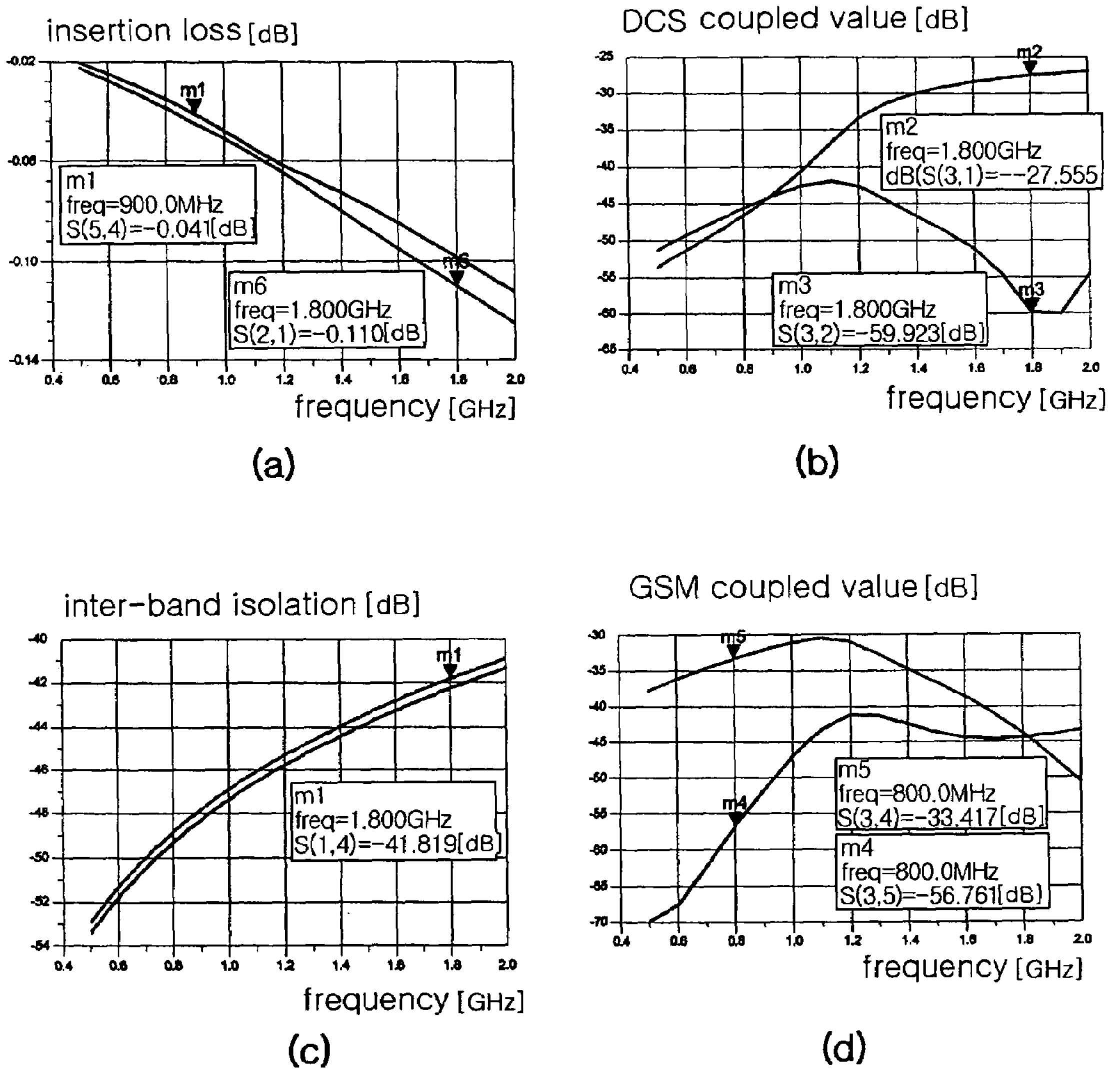
FIGS. 7a to 7d are views showing characteristics of the directional coupler according to the present invention.

FIG. 6 shows the configuration of a dual-band transmitter according to the present invention.

With reference to FIG. 6, the dual-band transmitter according to the present invention comprises a first power amplifier 111 for amplifying power of a first band signal BS1, which is a high-band signal, by an amplification factor determined depending on a bias voltage applied thereto, and a second power amplifier 121 for amplifying power of a second band signal BS2, which is a low-band signal, by an amplification factor determined depending on a bias voltage applied thereto. The directional coupler 140 is provided in the dual-band transmitter to couple a part of an output signal from the first power amplifier 111 and a part of an output signal from the second power amplifier 121, respectively. The dual-band transmitter according to the present invention further comprises a power amplifier controller 150 for comparing the level of a signal coupled by the directional coupler 140 with a predetermined reference value and regulating the bias voltage to the first power amplifier 111 or second power amplifier 121 according to a difference therebetween to control the amplification factor of the first power amplifier 111 or second power amplifier 121.

As stated previously with reference to FIG. 5, the directional coupler 140 includes the first filter FT1 which is connected to the first terminal 143A of the first directional coupling device 143 to high pass filter the coupled signal from the coupling device 143, and the second filter FT2 which is connected to the first terminal 144A of the second directional coupling device 144 to low pass filter the coupled signal from the coupling device 144.

The second terminal 143B of the first directional coupling device 143 is connected to the ground terminal through the resistor R1, and the second terminal 144B of the second directional coupling device 144 is connected to the ground terminal through the resistor R2.

Preferably, each of the resistors R1 and R2 is set to about 50Ω, so as to improve directivity of a corresponding one of the coupled signals.

FIGS. 7*a* to 7*d* are views showing characteristics of the directional coupler according to the present invention.

FIG. 7*a* shows respective insertion losses of DCS and GSM bands, FIG. 7*b* shows a coupled value of DCS 1800 MHz and an extracted power value appearing at the DCS band output port, FIG. 7*c* shows an inter-band isolation, and FIG. 7*d* shows a coupled value of the GSM band and an extracted power value appearing at the GSM band output port.

The operation of the present invention will hereinafter be described in detail with reference to the annexed drawings.

The directional coupler of the present invention is applied to a dual-band mobile communication terminal, such as a dual-band mobile phone, and is implemented with strip lines for signal coupling and inter-digital capacitors for phase compensation so that it can be improved in directivity and minimized in process error, which will hereinafter be described in detail with reference to FIGS. 5 to 7*d*.

With reference to FIGS. 5 and 6, first, the first power amplifier 111 amplifies power of a first band signal BS1, which is a high-band signal, by an amplification factor determined depending on a bias voltage applied thereto and outputs the resulting signal, and the second power amplifier 121 amplifies power of a second band signal BS2, which is a low-band signal, by an amplification factor determined depending on a bias voltage applied thereto and outputs the resulting signal. Here, the first band signal BS1 may be a GSM1800 (DCS1800) signal of about 1800 MHz or a GSM1900 (PCS1900) signal of about 1900 MHz, and the second band signal BS2 may be a GSM900 (GSM) signal or E-GSM signal of about 900 MHz.

Then, a part of the output signal from the first power amplifier 111 and a part of the output signal from the second power amplifier 121 are coupled by the directional coupler 140 and provided to the power amplifier controller 150. A detailed description will hereinafter be given of the operation of the directional coupler 140 with reference to FIG. 5.

With reference to FIG. 5, the first band signal BS1 is transmitted through the first transmission device 141 of the directional coupler 140 of the present invention. At this time, a part of the first band signal BS1 from the first transmission device 141 is coupled by the first directional coupling device 143 while the first band signal BS1 is inputted to the first port 1 of the first transmission device 141 and outputted through the second port 2 thereof.

Thereafter, a signal coupled by the first directional coupling device 143 is provided to the first filter FT1 connected to the first terminal 143A of the coupling device 143.

The signal coupled by the first directional coupling device 143 is also improved in directivity by the first inter-digital capacitor 145 connected between the first transmission device 141 and the first directional coupling device 143.

Meanwhile, the second band signal BS2 is transmitted through the second transmission device 142 of the directional coupler 140 of the present invention. At this time, a part of the second band signal BS2 from the second transmission device 142 is coupled by the second directional coupling device 144 while the second band signal BS2 is inputted to the first port 4 of the second transmission device 142 and outputted through the second port 5 thereof.

Thereafter, a signal coupled by the second directional coupling device 144 is provided to the second filter FT2 connected to the first terminal 144A of the coupling device 144.

The signal coupled by the second directional coupling device 144 is also improved in directivity by the second inter-digital capacitor 146 connected between the second transmission device 142 and the second directional coupling device 144.

Notably, the use of an MIM (Metal-Insulator-Metal) capacitor as in a conventional directional coupler has a limitation in providing a precise and small capacitance, since it has a large process error due to characteristics thereof. On the contrary, the use of an inter-digital capacitor in the directional coupler of the present invention enables the provision of a small capacitance. For example, it is possible to provide an inter-digital capacitance of about 0.03 to 0.04 pF at each frequency and adjust it by an inter-line distance and line length.

In other words, for application to a terminal requiring a small coupled value, the length of a strip line is limited to less than about 400 μm and a capacitor for phase compensation is used in the directional coupler of the present invention. The use of such a capacitor for phase compensation can not only improve directivity of the coupler, but also provide a precise and small capacitance.

For example, in a terminal requiring a small coupled value of about −33 dB or −28 dB, there may be a great variation in coupled value depending on a capacitance deviation. However, in the case where the inter-digital capacitor of the present invention is applied, it can provide a small and precise capacitance of about 0.03 to 0.04 pF, thereby making it possible to manage the process error of the capacitor within the range of 3%.

Each of the inter-digital capacitors 145 and 146 has a capacitance which is determined depending on, not a dielectric constant of a thin-film insulating layer, but an inter-line distance and line length, so there is little capacitance deviation in a semiconductor process.

On the other hand, a via process and parasitic capacitance make it difficult to provide a capacitance of 0.1 pF or less in an integrated passive device (IPD) process. However, the use of a semiconductor process enables the chip size of the directional coupler to become 1×1 mm or less and, thus, the height thereof to be reduced significantly as compared with that of a low temperature cofired ceramics (LTCC) substrate. Further, the price competitiveness of the directional coupler can be raised owing to mass production and cost curtailment thereof.

On the other hand, the inter-digital capacitors 145 and 146 have no process error due to characteristics thereof. As a result, the use of these inter-digital capacitors 145 and 146 can improve directivity of the directional coupler and minimize a process error thereof, as can be expressed by rough values as in the below table 1.

TABLE 1

Figure 3:
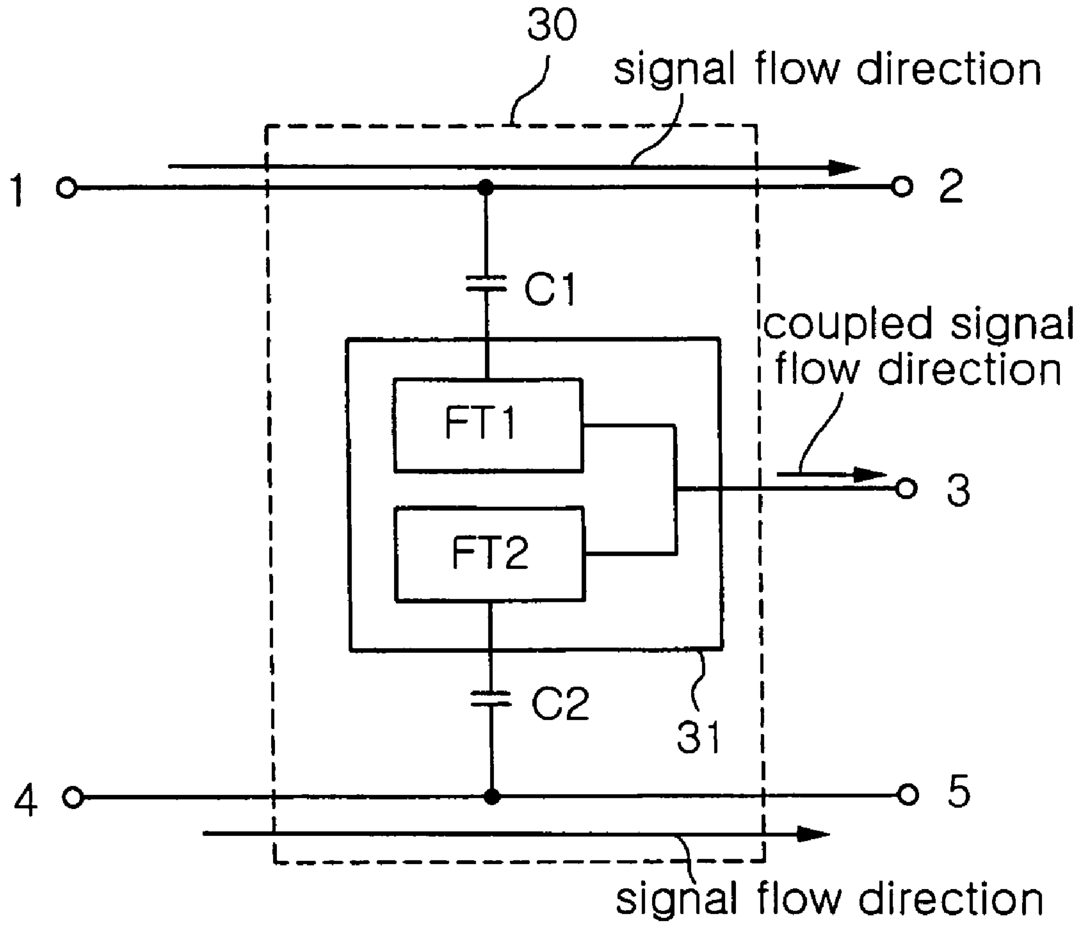
PRIOR ART FIG. 3
FIG. 3 is a schematic view of another conventional directional coupler.

| DIRECTIONAL COUPLER | COUPLED VALUE [dB] GSM | DCS | DIRECTIVITY [dB] | ISOLATION [dB] | REMARK |
|---|---|---|---|---|---|
| CONVENTIONAL [FIG. 3] | −33 (±3) | −28 (±3) | −1 | −30 | BAD DIRECTIVITY SERIOUS PROCESS ERROR |
| PRESENT [FIG. 5] | −33 (±0.5) | −28 (±0.5) | −25 | −40 | MINIMIZED PROCESS ERROR |

Figure 4:
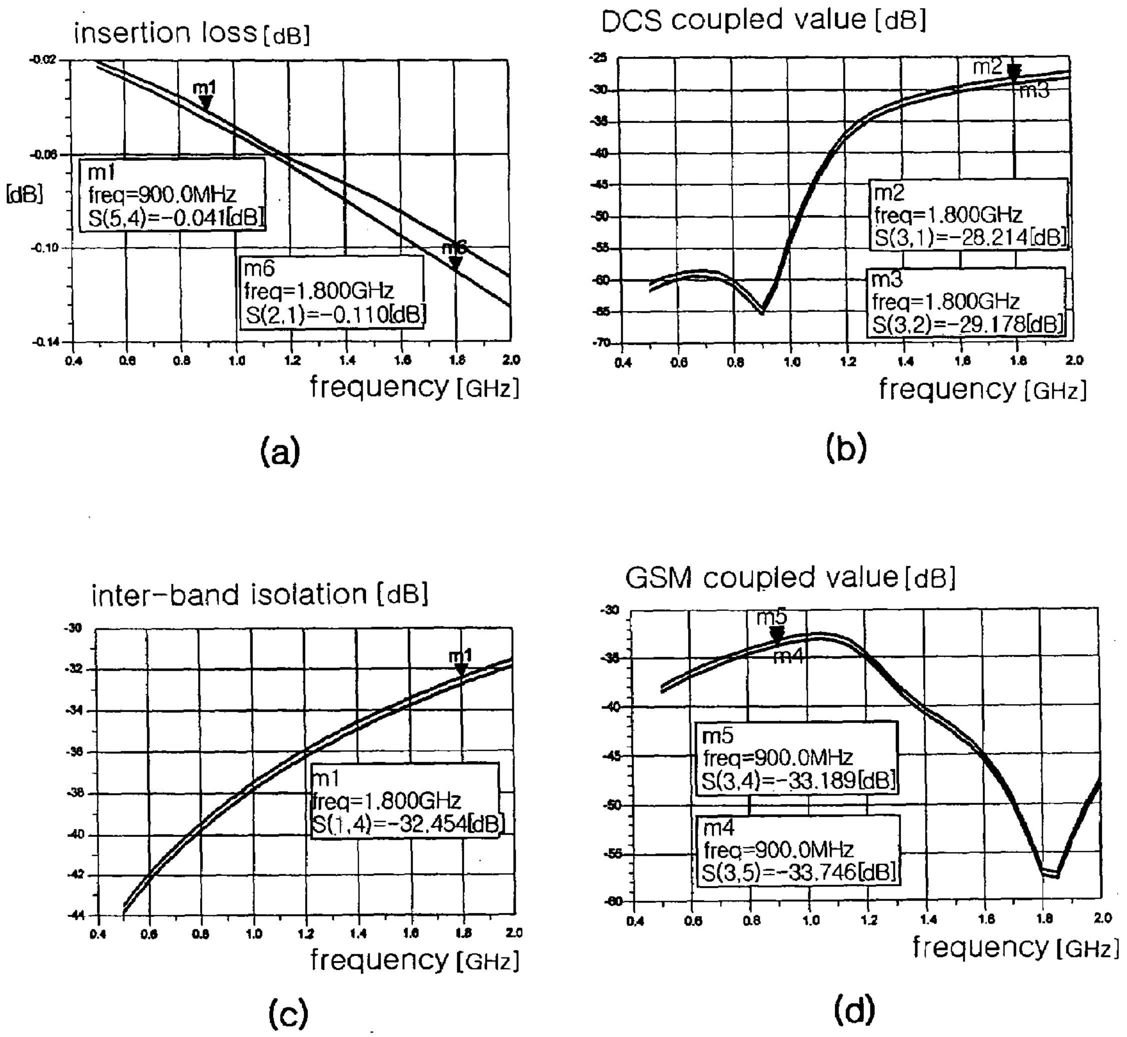
PRIOR ART FIG. 4
FIGS. 4a to 4d are views showing characteristics of the directional coupler of FIG. 3.

In the above table 1, the conventional coupled values are rough values of ‘m2’ in FIG. 4*b* and ‘m5’ in FIG. 4*d* and the present coupled values are rough values of ‘m2’ in FIG. 7*b* and ‘m5’ in FIG. 7*d*. The conventional directivity is an average value of ‘m2–m3’ in FIG. 4*b* and the present directivity is an average value of ‘m2–m3’ in FIG. 7*b*. The conventional inter-band isolation is a rough value of ‘m1’ in FIG. 4*c* and the present inter-band isolation is a rough value of ‘m1’ in FIG. 7*c*.

Next, the first filter FT1, which is connected to the first terminal 143A of the first directional coupling device 143, high pass filters the coupled signal from the coupling device 143. Also, the second filter FT2, which is connected to the first terminal 144A of the second directional coupling device 144, low pass filters the coupled signal from the coupling device 144.

Preferably, the first filter FT1 must be set to pass a frequency band of GSM1800 (DCS1800) or GSM1900 (PCS1900), for example, a high frequency band of about 1700 MHz or more, and the second filter FT2 must be set to pass a frequency band of GSM900 (GSM) or E-GSM, for example, a low frequency band of about 1000 MHz or less.

As a result, the first filter FT1 and the second filter FT2 provide the first band signal BS1 and the second band signal BS2 to the power amplifier controller 150 without interference therebetween, respectively.

The power amplifier controller 150 controls the amplification factor of the first power amplifier 111 or second power amplifier 121 by comparing the level of a signal coupled by the directional coupler 140 with a predetermined reference value and regulating the bias voltage to the first power amplifier 111 or second power amplifier 121 according to a difference therebetween.

Characteristics of the above-described directional coupler 140 of the present invention will hereinafter be described with reference to FIGS. 7*a* to 7*d*.

FIGS. 7*a* to 7*d* are views showing characteristics of the directional coupler 140 according to the present invention.

In FIG. 7*a*, S(2,1) and S(5,4) are insertion losses of DCS and GSM bands, respectively. In FIG. 7*b*, S(3,1) is a coupled value of DCS 1800 MHz, and S(3,2) is an extracted power value appearing at the DCS band output port. Here, the difference between S(3,1) and S(3,2) signifies directivity. In FIG. 7*c*, S(1,4) is an inter-band isolation. In FIG. 7*d*, S(3,4) is a coupled value of the GSM band, and S(3,5) is an extracted power value appearing at the GSM band output port. Here, the difference between S(3,4) and S(3,5) signifies directivity.

As shown in FIGS. 7*b* and 7*d*, the directivities, which are the difference between S(3,2) and S(3,1) and the difference between S(3,4) and S(3,5), appear as high values of about −30 dB. Therefore, the use of the inter-digital capacitors can significantly improve the directivities and inter-band isolation.

Next, the power amplifier controller 150 compares the level of a signal coupled by the directional coupler 140 with a predetermined reference value and regulates the bias voltage to the first power amplifier 111 or second power amplifier 121 according to a difference therebetween, so as to control the amplification factor of the first power amplifier 111 or second power amplifier 121.

According to the directional coupler of the present invention as described above, a sufficient isolation can be secured between the first band signal and the second band signal and directivity can be improved, as well.

On the other hand, in the case where the present directional coupler is manufactured in an IPD process, it has the effect of being reduced in size and height to 30 to 50% of that manufactured in an LTCC process. In addition, provided that the coupler employs a Si substrate, it will be applicable to future CMOS processes.

Moreover, the application of an inter-digital capacitor to the directional coupler of the present invention can significantly improve directivity of the coupler and significantly reduce a process error thereof due to characteristics of the inter-digital capacitor, so as to enhance yield of the coupler.

As apparent from the above description, the present invention provides a directional coupler which is applied to a dual-band mobile communication terminal, such as a dual-band mobile phone, and is implemented with strip lines for signal coupling and inter-digital capacitors for phase compensation. According to the invention, the directional coupler can be improved in directivity, minimized in process error and miniaturized to be readily implemented in one-chip form.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A directional coupler comprising:

a first transmission device for transmitting a first band signal;

a first directional coupling device including a first terminal and a second terminal and spaced apart from said first transmission device by a predetermined distance, said first directional coupling device coupling a part of said first band signal from said first transmission device and generating the coupled signal at said first terminal thereof, said second terminal of said first directional coupling device being connected to a ground terminal;

a first inter-digital capacitor having its one side connected to said first transmission device and its other side connected to said first directional coupling device;

a second transmission device for transmitting a second band signal;

a second directional coupling device including a first terminal and a second terminal and spaced apart from said second transmission device by a predetermined distance, said second directional coupling device coupling a part of said second band signal from said second transmission device and generating the coupled signal at said first terminal thereof, said second terminal of said second directional coupling device being connected to said ground terminal; and a second inter-digital capacitor having its one side connected to said second transmission device and its other side connected to said second directional coupling device.

2. The directional coupler as set forth in claim 1, further comprising:

a first filter connected to said first terminal of said first directional coupling device for high pass filtering the coupled signal from said first directional coupling device; and a second filter connected to said first terminal of said second directional coupling device for low pass filtering the coupled signal from said second directional coupling device.

3. The directional coupler as set forth in claim 2, wherein said second terminal of said first directional coupling device is connected to said ground terminal through a resistor.

4. The directional coupler as set forth in claim 2, wherein said second terminal of said second directional coupling device is connected to said ground terminal through a resistor.

5. A dual-band transmitter for a dual-band mobile communication terminal, comprising:

a first power amplifier for amplifying power of a first band signal by an amplification factor determined depending on a bias voltage applied thereto, said first band signal being a high-band signal;

a second power amplifier for amplifying power of a second band signal by an amplification factor determined depending on a bias voltage applied thereto, said second band signal being a low-band signal;

a directional coupler for coupling a part of said first band signal power-amplified by said first power amplifier and a part of said second band signal power-amplified by said second power amplifier, respectively, said direction coupler including:

a first transmission device for transmitting said first band signal power-amplified by said first power amplifier;

a first directional coupling device including a first terminal and a second terminal and spaced apart from said first transmission device by a predetermined distance, said first directional coupling device coupling a part of said first band signal from said first transmission device and generating the coupled signal at said first terminal thereof, said second terminal of said first directional coupling device being connected to a ground terminal;

a first inter-digital capacitor having its one side connected to said first transmission device and its other side connected to said first directional coupling device;

a second transmission device for transmitting said second band signal power-amplified by said second power amplifier;

a second directional coupling device including a first terminal and a second terminal and spaced apart from said second transmission device by a predetermined distance, said second directional coupling device coupling a part of said second band signal from said second transmission device and generating the coupled signal at said first terminal thereof, said second terminal of said second directional coupling device being connected to said ground terminal;

a second inter-digital capacitor having its one side connected to said second transmission device and its other side connected to said second directional coupling device;

a first filter connected to said first terminal of said first directional coupling device for high pass filtering the coupled signal from said first directional coupling device; and a second filter connected to said first terminal of said second directional coupling device for low pass filtering the coupled signal from said second directional coupling device; and a power amplifier controller for comparing the level of a signal coupled by said directional coupler with a predetermined reference value and regulating said bias voltage to said first power amplifier or second power amplifier according to a difference therebetween to control said amplification factor of said first power amplifier or second power amplifier.

6. The dual-band transmitter as set forth in claim 5, wherein said second terminal of said first directional coupling device is connected to said ground terminal through a resistor.

7. The dual-band transmitter as set forth in claim 6, wherein said second terminal of said second directional coupling device is connected to said ground terminal through a resistor.

* * * * *